United States Patent
Huang et al.

(10) Patent No.: US 12,169,428 B2
(45) Date of Patent: *Dec. 17, 2024

(54) POWER SUPPLY APPARATUS, POWER SUPPLY SYSTEM, AND DATA CENTER

(71) Applicant: Huawei Digital Power Technologies Co., Ltd., Shenzhen (CN)

(72) Inventors: Zhuyong Huang, Dongguan (CN); Xiaofei Zhang, Dongguan (CN); Zhengdong Jiang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 266 days.

This patent is subject to a terminal disclaimer.

(21) Appl. No.: 17/735,608

(22) Filed: May 3, 2022

(65) Prior Publication Data

US 2022/0269325 A1    Aug. 25, 2022

Related U.S. Application Data

(63) Continuation of application No. PCT/CN2020/130165, filed on Nov. 19, 2020.

(30) Foreign Application Priority Data

Feb. 27, 2020    (CN) .......................... 202010125643.4

(51) Int. Cl.
  *G06F 1/26*    (2006.01)
  *H02M 3/155*    (2006.01)
  (Continued)

(52) U.S. Cl.
  CPC .............. *G06F 1/26* (2013.01); *H02M 3/155* (2013.01); *H02M 7/217* (2013.01); *H02J 1/10* (2013.01);
  (Continued)

(58) Field of Classification Search
  CPC ......... G06F 1/26; H02M 3/155; H02M 7/217; H02J 1/102; H02J 3/32; H02J 3/36;
  (Continued)

(56) References Cited

U.S. PATENT DOCUMENTS

2014/0152109 A1* 6/2014 Kanakasabai ........... H02J 9/062
                                                          307/64
2019/0044370 A1* 2/2019 Mondal ..................... H02J 9/04
(Continued)

FOREIGN PATENT DOCUMENTS

CN    103023131 A    4/2013
CN    103516221 A    1/2014
(Continued)

OTHER PUBLICATIONS

M. Saghaleini et al.,"An Advanced Distributed Power Supply for Power Electronic Transformers", The 33rd Annual Conference of the IEEE Industrial Electronics Society (IECON), Nov. 5-8, 2007, Taipei, Taiwan; pp. 2038-2043; 6 total pages.
(Continued)

*Primary Examiner* — Yemane Mehari
(74) *Attorney, Agent, or Firm* — Rimon PC

(57) ABSTRACT

Embodiments of this application disclose a power supply apparatus, a power supply system, and a data center designed to reduce the number of power conversion steps, equipment costs, and circuit loss. The power supply apparatus includes: a solid-state transformer configured to convert an alternating current into a first direct current; a first direct current/direct current converter, coupled to the solid-state transformer and configured to convert the first direct current into a second direct current; an energy storage component, coupled to the first direct current/direct current converter and configured to perform energy storage on the second direct current; and a second direct current/direct
(Continued)

current converter, coupled to the first direct current/direct current converter and configured to convert the second direct current into a third direct current, where the third direct current is used to supply power to a load.

14 Claims, 8 Drawing Sheets

(51) Int. Cl.
*H02M 7/217* (2006.01)
*H02J 1/10* (2006.01)
*H02J 7/02* (2016.01)
*H02J 9/06* (2006.01)

(52) U.S. Cl.
CPC ............... *H02J 7/02* (2013.01); *H02J 9/061* (2013.01); *H02J 2310/16* (2020.01)

(58) Field of Classification Search
CPC ...... H02J 3/38; H02J 7/02; H02J 9/061; H02J 2310/16
USPC ........................................ 363/65; 307/43, 82
See application file for complete search history.

(56) References Cited

U.S. PATENT DOCUMENTS

2019/0267811 A1* 8/2019 Sarti ................... H02M 7/7575
2020/0195138 A1* 6/2020 Lin ......................... H02J 9/062

FOREIGN PATENT DOCUMENTS

| CN | 105490552 A | 4/2016 |
| CN | 106300325 A | 1/2017 |
| CN | 106602565 A | 4/2017 |
| CN | 106953377 A | 7/2017 |
| CN | 107040039 A | 8/2017 |
| CN | 107800133 A | 3/2018 |
| CN | 107910872 A | 4/2018 |
| CN | 207977740 U | 10/2018 |
| CN | 110086247 A | 8/2019 |
| CN | 110356268 A | 10/2019 |
| CN | 210007410 U | 1/2020 |
| CN | 111384718 A | 7/2020 |
| DE | 102017105843 A1 | 9/2018 |
| JP | 2018148703 A | 9/2018 |
| WO | 2019169093 A1 | 9/2019 |

OTHER PUBLICATIONS

Lu Qiwei et al.,"Key technologies and feasibility analysis of coal mine DC power distribution network", Journal of China Coal Society, vol. 40, No. 10, Oct. 2015, with an English abstract; pp. 2496-2502; 7 total pages.

Anonymous: "Solid State Transformer (SST)," Freedm Architecture, The Wayback Machine, Jan. 16, 2018, XP093093106; 4 pages.

* cited by examiner

POWER SUPPLY APPARATUS, POWER SUPPLY SYSTEM, AND DATA CENTER

CROSS-REFERENCE TO RELATED APPLICATIONS

This application claims is a continuation of International Application No. PCT/CN2020/130165, filed on Nov. 19, 2020, which claims priority to Chinese Patent Application No. 202010125643.4, filed on Feb. 27, 2020. The disclosures of the aforementioned applications are hereby incorporated by reference in their entireties.

TECHNICAL FIELD

This application relates to the field of power supply, and in particular, to a power supply apparatus, a power supply system, and a data center.

BACKGROUND

In the field of data center power supply, power supply in a power grid that enters a building is a medium-voltage alternating current (for example, a 10 kV alternating current). However, a load (for example, a server) in a data center needs to be powered by a low-voltage direct current (for example, a 12 V direct current). After the power grid enters the building, the medium-voltage alternating current needs to be converted into a low-voltage direct current by a converter to supply power to the load.

In the conventional technologies, a schematic diagram of a structure of a power supply system for a data center may be shown in FIG. 1. In FIG. 1, a 10 kV alternating current is converted into a 400 V alternating current after passing through a low-frequency transformer. The 400 V alternating current is converted into a 240 V direct current after passing through a high-voltage direct current (HVDC) converter. The 240 V direct current passes through a server power supply to perform voltage conversion, and is converted into a 12 V direct current to supply power to a load. The power supply system further includes a battery, and the battery is connected to an output terminal of the HVDC converter to implement power backup. When the power supply system has no electric energy input, the power supply system may supply power to the load by using electric energy stored in the battery.

In the power supply system shown in FIG. 1, the HVDC converter includes two converters: an alternating current/direct current (AC/DC) converter and a DC/DC converter. The AC/DC converter is configured to convert the alternating current into the direct current, and an output of the DC/DC converter is used to implement power backup for the battery and provide an input for the server power supply. A voltage of the battery changes dynamically in a charging or discharging period. Therefore, the 240 V direct current output by the HVDC converter changes dynamically. If the variable 240 V direct current is converted into the 12 V direct current by using one DC/DC converter, a power indicator of the 12 V direct current is relatively poor, and can hardly meet a load requirement. Therefore, one DC/DC converter is usually needed in a server power supply to stabilize an input direct current at a stable value, and then one DC/DC converter is used for conversion into the required 12 V direct current. Therefore, there are usually two converters in the server power supply.

In the power supply system shown in FIG. 1, there are a plurality of power conversion steps, and this increases equipment costs and circuit loss.

In conclusion, a power supply solution for a data center is urgently needed to reduce the number of power conversion steps, equipment costs, and circuit loss.

SUMMARY

Embodiments of this application provide a power supply apparatus, a power supply system, and a data center, to reduce the number of power conversion steps, equipment costs, and circuit loss.

According to a first aspect, an embodiment of this application provides a power supply apparatus. The power supply apparatus includes: a solid-state transformer, configured to convert an alternating current into a first direct current; a first direct current/direct current converter, coupled to the solid-state transformer, and configured to convert the first direct current into a second direct current; an energy storage component, coupled to the first direct current/direct current converter, and configured to perform energy storage on the second direct current; and the second direct current/direct current converter, coupled to the first direct current/direct current converter, and configured to convert the second direct current into a third direct current, where the third direct current is used to supply power to a load.

The load may be a server in a data center, and the energy storage component may be a battery.

According to the power supply apparatus provided in the first aspect, the solid-state transformer is used to convert the alternating current to obtain the first direct current, and the first direct current may be directly output to the load after conversion by the second DC/DC converter, so as to supply power to the load. Compared with a power supply system provided in the conventional technologies, in the power supply system provided in this application, fewer power conversion components are required to convert an alternating current into a direct current that supplies power to a load. This reduces the costs and occupied space of the power supply apparatus, and reduces loss in the power supply process. In addition, during energy storage, after the first DC/DC converter converts the first direct current into the second direct current, the energy storage component performs energy storage on the second direct current, so that a voltage change of the energy storage component does not affect the second DC/DC converter, thereby avoiding voltage fluctuations when power is supplied to the load.

Specifically, the solid-state transformer may include a first alternating current/direct current converter, configured to convert the alternating current into a primary direct current; and a high-frequency direct current/direct current converter, coupled to the first alternating current/direct current converter, and configured to convert the primary direct current into the first direct current.

Compared with a low-frequency DC/DC converter, the high-frequency DC/DC converter used in the solid-state transformer has a higher operating frequency, uses a smaller quantity of materials (for example, a winding wire), and has a smaller structural size and lower costs.

In a possible design, the solid-state transformer further includes a controller, configured to control parameters of the high-frequency direct current/direct current converter.

The parameters of the high-frequency DC/DC converter may include a droop slope, and may further include bandwidths of a voltage loop and a current loop.

In a possible design, the power supply apparatus provided in the first aspect further includes a switch unit, where a first terminal of the switch unit is coupled to the first direct current/direct current converter, and a second terminal of the switch unit is coupled to the second direct current/direct current converter.

According to the foregoing solution, when the solid-state transformer in the power supply apparatus needs to be maintained, the switch unit may be controlled to be opened, so that a maintenance person can maintain the solid-state transformer. After the maintenance of the solid-state transformer is completed, the switch unit may be controlled to be closed, so that the power supply apparatus continues to operate and supplies power to the load.

According to a second aspect, an embodiment of this application provides a power supply system. The power supply system includes a first power supply apparatus, a second power supply apparatus, and a bus tie switch unit, where the first power supply apparatus includes: a first solid-state transformer, configured to convert a first alternating current into a first direct current; a first direct current/direct current converter, coupled to the first solid-state transformer, and configured to convert the first direct current into a second direct current; a first energy storage component, coupled to the first direct current/direct current converter, and configured to perform energy storage on the second direct current; a first switch unit, separately coupled to the first direct current/direct current converter and a second direct current/direct current converter; and the second direct current/direct current converter, coupled to the first switch and configured to convert the second direct current into a third direct current, where the third direct current is used to supply power to a load; and the second power supply apparatus includes: a second solid-state transformer, configured to convert a second alternating current into a fourth direct current; a third direct current/direct current converter, coupled to the second solid-state transformer, and configured to convert the fourth direct current into a fifth direct current; a second energy storage component, coupled to the third direct current/direct current converter, and configured to perform energy storage on the fifth direct current; a second switch unit, separately coupled to the third direct current/direct current converter and a fourth direct current/direct current converter; and the fourth direct current/direct current converter, coupled to the second switch unit, and configured to convert the fifth direct current into a sixth direct current, where the sixth direct current is used to supply power to the load; where two terminals of the bus tie switch unit are respectively coupled to the first switch unit and the second switch unit.

The load may be a server in a data center, the first energy storage component and the second energy storage component may be batteries, the third direct current is used to supply power to some components in the server, and the sixth direct current is used to supply power to the other components in the server.

According to the power supply system provided in the second aspect, in each power supply apparatus, the solid-state transformer may be used to convert an alternating current to obtain a direct current, so that the DC/DC converter converts the obtained direct current into a direct current that supplies power to some components in the load. This conversion process requires a relatively small quantity of power conversion components, reduces the costs and occupied space of the power supply apparatus, and reduces loss in power supply steps. In addition, during energy storage, another DC/DC converter is used to convert the direct current output by the solid-state transformer into a direct current on which the energy storage component performs energy storage. In this way, a voltage fluctuation of the energy storage component in a charging or discharging process does not affect a next-stage circuit, thereby avoiding voltage fluctuations when power is supplied to some components in the load. By using the two power supply apparatuses in the power supply system, power can be supplied to all the components in the load. A relatively small quantity of power conversion components are used in each of the two power supply apparatuses. This reduces the costs and occupied space of the power supply system, and reduces loss in the power supply process.

Specifically, the first solid-state transformer includes: a fifth alternating current/direct current converter, configured to convert the first alternating current into a first primary direct current, and a first high-frequency direct current/direct current converter, coupled to the fifth alternating current/direct current converter, and configured to convert the first primary direct current into the first direct current; and the second solid-state transformer includes: a sixth alternating current/direct current converter, configured to convert the second alternating current into a second primary direct current, and a second high-frequency direct current/direct current converter, coupled to the sixth alternating current/direct current converter, and configured to convert the second primary direct current into the fourth direct current.

The first high-frequency DC/DC converter and the second high-frequency DC/DC converter are DC/DC converters that include power electronic components. Compared with a conventional low-frequency DC/DC converter, the high-frequency DC/DC converter has a smaller quantity of turns of coils, a smaller structural size, and lower costs. In addition, the high-frequency DC/DC converter may further be configured to implement isolation between an alternating current and a direct current, so as to avoid the alternating current from interfering with the direct current.

In a possible design, the first solid-state transformer further includes: a first controller, configured to control parameters of the first high-frequency direct current/direct current converter; and the second solid-state transformer further includes: a second controller, configured to control parameters of the second high-frequency direct current/direct current converter.

The parameters of the high-frequency DC/DC converter may include a droop slope, and may further include bandwidths of a voltage loop and a current loop.

In a possible design, when the power supply system operates normally, the first switch unit and the second switch unit are closed, and the bus tie switch unit is opened; when the first solid-state transformer needs to be maintained, the bus tie switch unit is closed and the first switch unit is opened; and after the maintenance of the first solid-state transformer is completed, the first switch unit is closed and the bus tie switch unit is opened; and when the second solid-state transformer needs to be maintained, the bus tie switch unit is closed and the second switch unit is opened; and after the maintenance of the second solid-state transformer is completed, the second switch unit is closed and the bus tie switch unit is opened.

According to the foregoing solution, when the first solid-state transformer needs to be maintained, the first switch unit is opened, the first power supply apparatus no longer operates, the bus tie switch unit is closed, and the fourth direct current output by the second solid-state transformer in the second power supply apparatus may be output to the second DC/DC converter by using the bus tie switch unit. Therefore, the second power supply apparatus may replace the first power supply apparatus to supply power to a first part of components in the load. In other words, when the first solid-state transformer needs to be maintained, the second power supply apparatus supplies power to all components in the load. Similarly, when the second solid-state transformer needs to be maintained, the second switch unit is opened, the second power supply apparatus no longer operates, the bus tie switch unit is closed, and the first direct current output by the first solid-state transformer in the first power supply apparatus may be output to the fourth DC/DC converter by using the bus tie switch unit. Therefore, the first power supply apparatus may replace the second power supply apparatus to supply power to a second part of components in the load. In other words, when the second solid-state transformer needs to be maintained, the first power supply apparatus supplies power to all the components in the load.

According to a third aspect, an embodiment of this application further provides a data center. The data center includes a load and the power supply system according to any one of the second aspect and the possible designs of the second aspect, and the power supply system is configured to supply power to the load.

By using the data center provided in the third aspect, because a relatively small quantity of power conversion components are required in the power supply apparatus included in the power supply system, the costs and occupied space of the power supply system can be reduced, and loss in power supply steps can be reduced, thereby further reducing circuit loss of the data center.

According to a fourth aspect, an embodiment of this application further provides a data center. The data center includes N loads, at least one bus tie switch unit, and N power supply apparatuses according to any one of the first aspect and the possible designs of the first aspect, where $N \geq 2$; and an $n^{th}$ power supply apparatus in the N power supply apparatuses is coupled to an $(n+1)^{th}$ power supply apparatus by using one bus tie switch unit, the N power supply apparatuses are configured to supply power to the N loads, and $1 \leq n \leq N-1$.

Specifically, in the N power supply apparatuses, a first power supply apparatus and a second power supply apparatus are configured to supply power to one load, the second power supply apparatus and a third power supply apparatus are configured to supply power to one load, . . . , an $(N-1)^{th}$ power supply apparatus and an $N^{th}$ power supply apparatus are configured to supply power to one load, and the first power supply apparatus and the $N^{th}$ power supply apparatus are configured to supply power to one load.

The data center provided in the fourth aspect may be considered as a distributed redundancy (DR) data center. By using the data center provided in the fourth aspect, because a relatively small quantity of power conversion components are required in each power supply apparatus, the costs and occupied space of the power supply apparatus can be reduced, and loss in power supply steps can be reduced, thereby further reducing circuit loss of the DR data center.

According to a fifth aspect, an embodiment of this application further provides a data center. The data center includes at least one load, at least one bus tie switch unit, and a plurality of power supply apparatuses according to any one of the first aspect and the possible designs of the first aspect, where the plurality of power supply apparatuses include a first power supply apparatus and at least one second power supply apparatus, and any one of the at least one second power supply apparatus and the first power supply apparatus are configured to supply power to one load in the data center; and each of the at least one second power supply apparatus is coupled to the first power supply apparatus by using one bus tie switch unit.

The data center provided in the fifth aspect may be considered as an N-base requirement+redundancy (N+R) data center. By using the data center provided in the fifth aspect, because a relatively small quantity of power conversion components are required in each power supply apparatus, the costs and occupied space of the power supply apparatus can be reduced, and loss in power supply steps can be reduced, thereby further reducing circuit loss of the N+R data center.

DESCRIPTION OF EMBODIMENTS

The following first describes an application scenario in the embodiments of this application.

Figure 2:
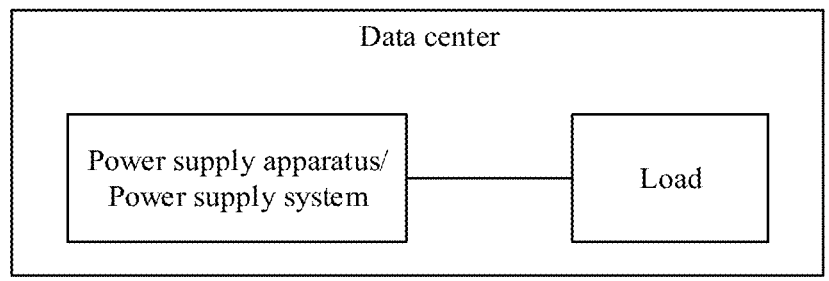
FIG. 2 is a schematic diagram of a structure of a first data center according to an embodiment of this application.

The embodiments of this application may be applied to a data center shown in FIG. 2. The data center includes a power supply apparatus/power supply system and a load. The power supply system may include a plurality of (for example, two) power supply apparatuses.

If the data center includes a power supply apparatus and a load, the power supply apparatus is configured to convert an alternating current into a direct current adaptive to the load, so as to supply power to the load.

If the data center includes a power supply system and a load, each power supply apparatus in the power supply system is configured to convert an alternating current into a direct current adaptive to some components in the load, so as to supply power to these components in the load. That is, a plurality of power supply apparatuses in the power supply system may supply power to different components in the load, respectively. For example, the load may be a server, and the power supply system may include two power supply apparatuses. One power supply apparatus is configured to supply power to a fan in the server, and the other power supply apparatus is configured to supply power to a chip and a logical circuit in the server.

An alternating current input to the power supply apparatus/power supply system may be a medium-voltage alternating current (for example, a 10 kV alternating current), and a direct current output by the power supply apparatus/power supply system may be a low-voltage direct current (for example, a 12 V direct current).

It should be noted that, the data center shown in FIG. 2 includes only one power supply apparatus/power supply system and one load. In actual application, the data center may include a plurality of power supply apparatuses/power supply systems and a plurality of loads. There may be a plurality of types of architectures for the plurality of power supply apparatuses/power supply systems and the plurality of loads. An embodiment of the architecture of the data center is described in the following description in the embodiments of this application, and details are not described herein.

In addition, it should also be noted that, the power supply apparatus and the power supply system provided in the embodiments of this application may be applied to not only a data center but also another application scenario in which an alternating current needs to be converted into a direct current to supply power to a load.

To make the objectives, technical solutions, and advantages of this application clearer, the following further describes this application in detail with reference to the accompanying drawings.

The embodiments of this application provide a power supply apparatus, a power supply system, and a data center to reduce a power conversion step, equipment costs, and a circuit loss.

Figure 3:
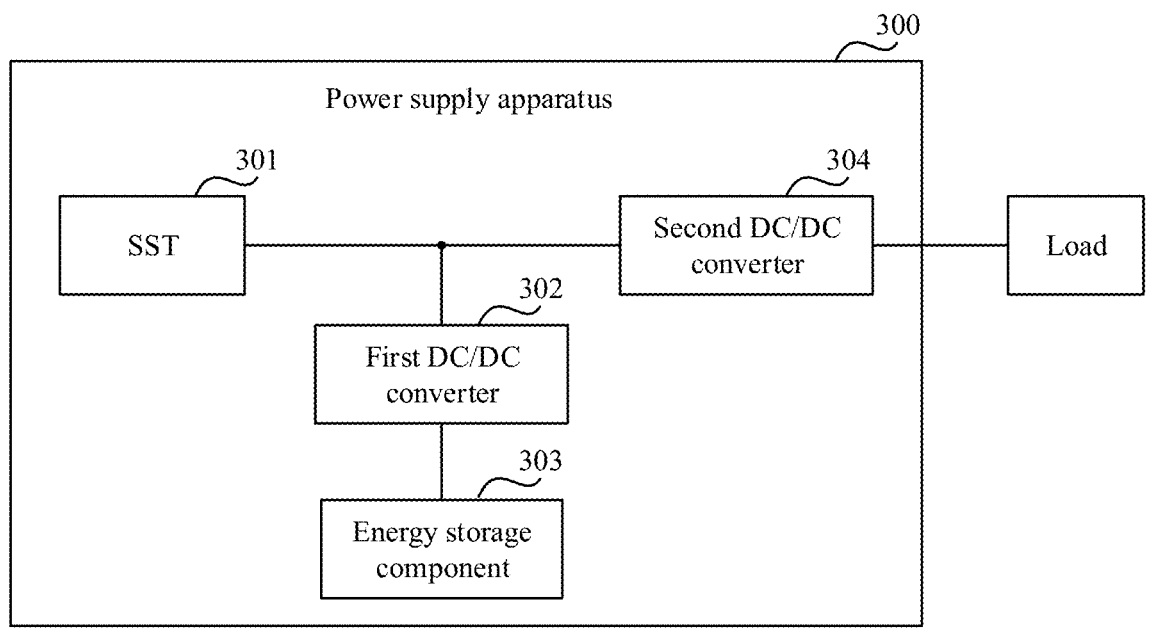
FIG. 3 is a schematic diagram of a structure of a power supply apparatus according to an embodiment of this application.

FIG. 3 is a schematic diagram of a structure of a power supply apparatus according to an embodiment of this application. The power supply apparatus 300 includes a solid-state transformer (SST) 301, a first DC/DC converter 302, an energy storage component 303, and a second DC/DC converter 304.

Specifically, the solid-state transformer 301 is configured to convert an alternating current input to the power supply apparatus into a first direct current. The first DC/DC converter 302 is coupled to the solid-state transformer 301 and configured to convert the first direct current into a second direct current. The energy storage component 303 is coupled to the first DC/DC converter 302 and configured to perform energy storage on the second direct current. The second DC/DC converter 304 is coupled to the first DC/DC converter 302, and is configured to convert the second direct current into a third direct current, where the third direct current is used to supply power to a load.

If the power supply apparatus 300 is applied to a data center, the load may be a server in the data center. For example, the alternating current input to the solid-state transformer 301 may be an alternating current medium voltage, and the first direct current, the second direct current, and the third direct current each may be a direct current low voltage. Then, the data center may implement conversion from the alternating current medium voltage to the direct current low voltage by using the power supply apparatus 300, so as to supply power to the server in the data center. For example, power supply in a power grid that enters a building (that is, a building in which a data center is located) is a three-phase 10 kV alternating current (which may be considered as the alternating current input to the solid-state transformer 301). After voltage conversion by the power supply apparatus 300, the power supply is converted into a 12 V direct current (which may be considered as the third direct current output by the second DC/DC converter 304), and the 12 V direct current may supply power to an end Internet technology (IT) device (such as a server) in the data center.

Figure 1:
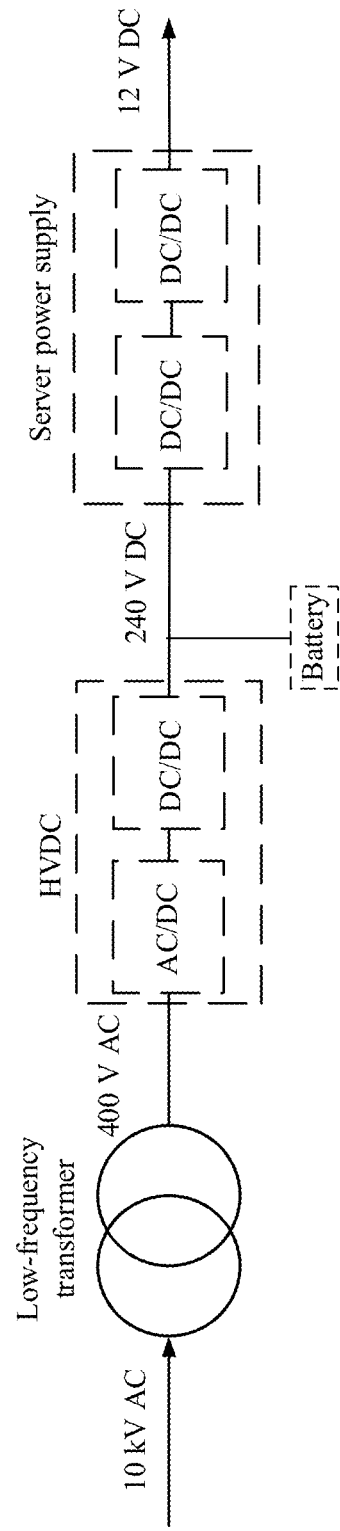
FIG. 1 is a schematic diagram of a structure of a power supply system for a data center according to the conventional technologies.

In the power supply system shown in FIG. 1, a low-frequency transformer outputs an alternating current. However, a direct current needs to be input when a battery performs energy storage. Therefore, an HVDC converter needs to convert the alternating current into a stable direct current, so as to implement power backup of the battery. In some embodiments of this application, the solid-state transformer 301 converts the alternating current into the first direct current, the first DC/DC converter 302 performs DC/DC conversion on the first direct current to obtain the second direct current, and the energy storage component 303 may perform energy storage on the second direct current. Specifically, the energy storage component 303 may be a battery.

The energy storage component may supply power to the load when the alternating current power grid encounters a power failure. A voltage of the energy storage component 303 changes dynamically during charging or discharging. Therefore, if the energy storage component 303 is directly connected to the solid-state transformer 301, a voltage fluctuation of the energy storage component 303 affects a next-stage circuit (that is, the second DC/DC converter 304) of the solid-state transformer 301. Consequently, the voltage of the next-stage circuit is unstable, resulting in a supply voltage fluctuation when power is supplied to the load. Therefore, in some embodiments of this application, the first DC/DC converter 302 may be used to convert the first direct current into the second direct current, and then the energy storage component 303 may perform energy storage by using the second direct current. In this case, a voltage fluctuation of the energy storage component 303 does not affect the first direct current, and does not affect normal operation of the next-stage circuit.

Specifically, in some embodiments of this application, the solid-state transformer 301 may include a first AC/DC converter and a high-frequency DC/DC converter. The first AC/DC converter is configured to convert the alternating current into a primary direct current. The high-frequency DC/DC converter is coupled to the first AC/DC converter, and is configured to convert the primary direct current into the first direct current.

The high-frequency DC/DC converter refers to a DC/DC converter that includes power electronic components inside. A conventional low-frequency DC/DC converter is composed of a silicon steel sheet and a winding wire, and has no power electronic component inside. The power electronic components include but are not limited to a metal-oxide semiconductor field-effect transistor (MOSFET), an insulated gate bipolar transistor (IGBT), and a silicon controlled rectifier (SCR).

The high-frequency DC/DC converter has a higher operating frequency than the low-frequency DC/DC converter. If some energy is transmitted by using a DC/DC converter, a higher operating frequency of the DC/DC converter indicates a higher quantity of energy transmissions within a period of time and less energy that needs to be transmitted each time. Therefore, when the operating frequency of the DC/DC converter is relatively high, the DC/DC converter uses a relatively small quantity of materials (for example, a winding wire) and has a relatively small structural size. That is, compared with the conventional low-frequency DC/DC converter, the high-frequency DC/DC converter has a smaller quantity of turns of coils, a smaller structural size, and lower costs.

In addition, the high-frequency DC/DC converter may further be configured to implement isolation between the alternating current and the first direct current, so as to avoid the alternating current from interfering with the first direct current.

In a possible implementation, the solid-state transformer 301 may further include a controller, and the controller is configured to control parameters of the high-frequency DC/DC converter.

Specifically, parameters of the high-frequency DC/DC converter may include a droop slope, and may further include bandwidths of a voltage loop and a current loop.

In addition, the power supply apparatus 300 may further include a switch unit, where a first terminal of the switch unit is coupled to the first DC/DC converter 302, and a second terminal of the switch unit is coupled to the second DC/DC converter 304. A specific type of the switch unit is not limited in this embodiment of this application. For example, the switch unit may be a transistor switch, and open and close of the switch unit may be controlled by using a control terminal (for example, a gate) of the transistor switch.

A function of the switch unit may be as follows: When the solid-state transformer 301 in the power supply apparatus 300 needs to be maintained, the switch unit may be controlled to be opened, so that a maintenance person can maintain the solid-state transformer 301. After the maintenance of the solid-state transformer 301 is completed, the switch unit may be controlled to be closed, so that the power supply apparatus 300 continues to operate and supplies power to the load.

In actual application, the open and close of the switch unit may be controlled by the controller in the solid-state transformer 301, or may be controlled by another controller in the system.

It can be learned from the foregoing description that, according to the power supply apparatus 300 provided in an embodiment of this application, the solid-state transformer 301 is used to convert the alternating current to obtain the first direct current, and the first direct current may be directly output to the load after conversion by the second DC/DC converter 304, so as to supply power to the load. Compared with the power supply system shown in FIG. 1, in the power supply system provided in some embodiments of this application, fewer power conversion components are required to convert an alternating current into a direct current that supplies power a load. This reduces the costs and occupied space of the power supply apparatus, and reduces loss in power supply steps. In addition, during energy storage, after the first DC/DC converter 302 converts the first direct current into the second direct current, the energy storage component 303 performs energy storage on the second direct current, so that a voltage change of the energy storage component 303 does not affect the second DC/DC converter 304, thereby avoiding a voltage fluctuation when power is supplied to the load.

Figure 4:
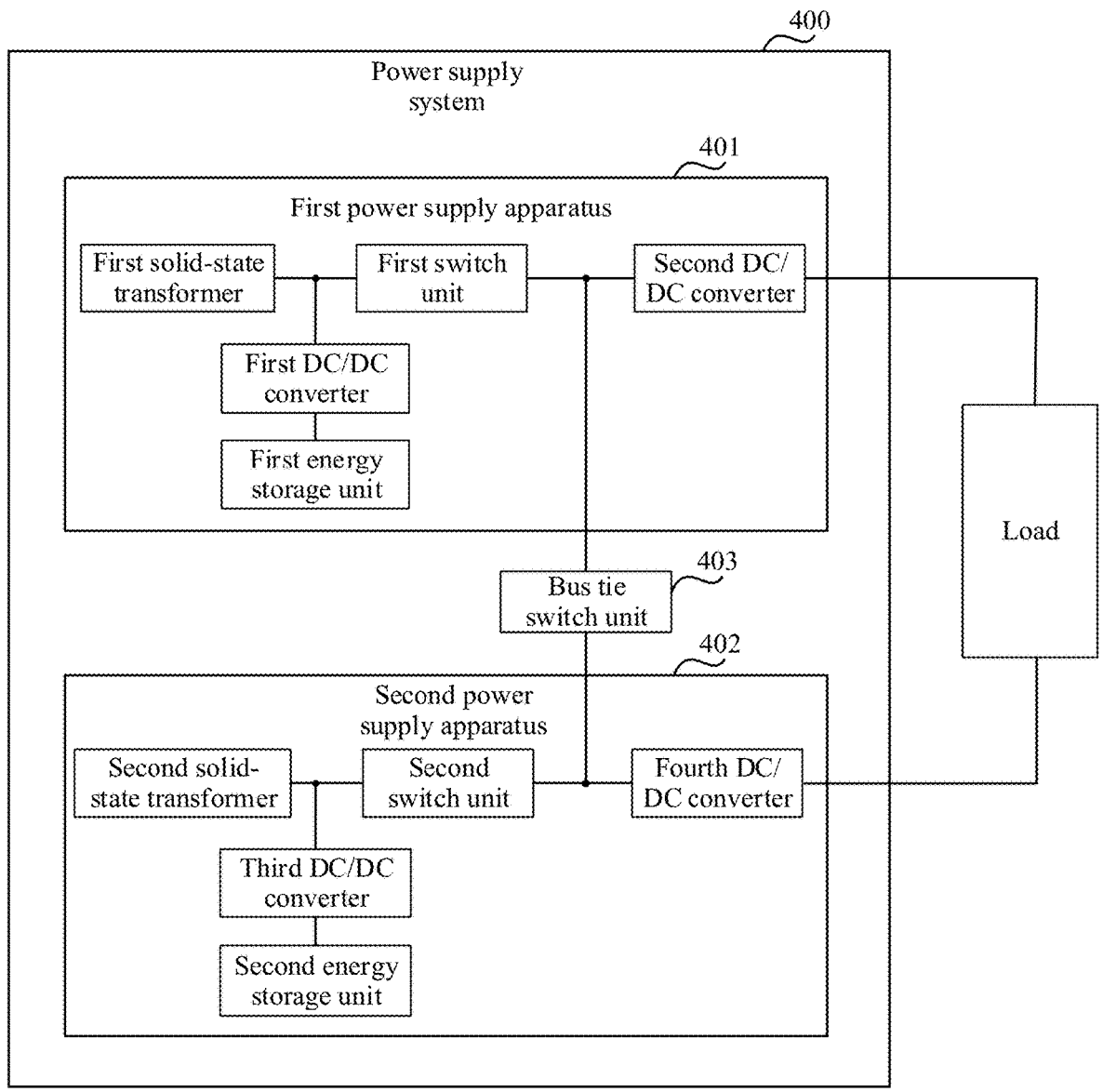
FIG. 4 is a schematic diagram of a structure of a power supply system according to an embodiment of this application.

Based on the same inventive concept, an embodiment of this application further provides a power supply system. Referring to FIG. 4, the power supply system 400 includes a first power supply apparatus 401, a second power supply apparatus 402, and a bus tie switch unit 403.

The first power supply apparatus 401 includes: a first solid-state transformer, configured to convert a first alternating current into a first direct current; a first DC/DC converter, coupled to the first solid-state transformer, and configured to convert the first direct current into a second direct current; a first energy storage component, coupled to the first DC/DC converter, and configured to perform energy storage on the second direct current; a first switch unit, separately coupled to the first DC/DC converter and the second DC/DC converter; and the second DC/DC converter, coupled to the first switch and configured to convert the second direct current into a third direct current, where the third direct current is used to supply power to a load.

The second power supply apparatus 402 includes: a second solid-state transformer, configured to convert a second alternating current into a fourth direct current; a third DC/DC converter, coupled to the second solid-state transformer, and configured to convert the fourth direct current into a fifth direct current; a second energy storage component, coupled to the third DC/DC converter, and configured to perform energy storage on the fifth direct current; a second switch unit, separately coupled to the third DC/DC converter and a fourth DC/DC converter; and the fourth DC/DC converter, coupled to the second switch unit, and configured to convert the fifth direct current into a sixth direct current, where the sixth direct current is used to supply power to the load.

Two terminals of the bus tie switch unit 403 are respectively coupled to the first switch unit and the second switch unit. In the example in FIG. 4, the two terminals of the bus tie switch unit 403 are respectively connected to a connection node between the first switch unit and the second DC/DC converter and a connection node between the second switch unit and the fourth DC/DC converter. In actual application, the two terminals of the bus tie switch unit 403 may alternatively be respectively connected to a connection node between the first switch unit and the first solid-state transformer and a connection node between the second switch unit and the second solid-state transformer. This is not specifically limited in this embodiment of this application.

It can be easily seen that, the power supply system 400 includes two power supply apparatuses, that is, the first power supply apparatus 401 and the second power supply apparatus 402. The first power supply apparatus 401 and the second power supply apparatus 402 each may be considered as an example of the foregoing power supply apparatus 300. The first power supply apparatus 401 and the second power supply apparatus 402 form the power supply system 400, and each power supply apparatus in the power supply system 400 is configured to convert an alternating current into a direct current adaptive to some components in the load, so as to supply power to these components in the load. For example, the first power supply apparatus 401 converts the first alternating current into the third direct current to supply power to a first part of components in the load; and the second power supply apparatus 402 converts the second alternating current into the sixth direct current to supply power to a second part of components in the load. The first part and the second part of components are all components that need power supply in the load. In this case, power can be supplied to all the components in the load by using the two power supply apparatuses in the power supply system 400.

If the power supply system 400 is applied to a data center, the load may be a server in the data center, and the first energy storage component and the second energy storage component may be batteries. For example, the first alternating current input to the first power supply apparatus 401 may be an alternating current medium voltage, the third direct current output by the first power supply apparatus 401 may be a direct current low voltage; and the second alternating current input to the second power supply apparatus 402 may be an alternating current medium voltage, and the sixth direct current output by the second power supply apparatus 402 may be a direct current low voltage. In this case, the data center may implement conversion from the alternating current medium voltage to the direct current low voltage by using the power supply system 400, so as to supply power to the server in the data center. In addition, energy storage may be further implemented by using the battery in the first power supply apparatus 401 and the battery in the second power supply apparatus 402. When the alternating current power grid encounters a power failure, the battery in each power supply apparatus continues to supply power to the load.

For example, power supply in a power grid that enters a building (that is, a building in which the data center is located) is three-phase 10 kV alternating currents (which may be considered as the first alternating current and the second alternating current). After voltage conversion by the first power supply apparatus 401 and the second power supply apparatus 402 in the power supply system 400, two 12 V direct currents (which may be considered as the third direct current and the sixth direct current) are obtained, and each 12 V direct current may supply power to some components in an end IT device (such as a server) in the data center.

In the power supply system 400, the structures of the first solid-state transformer and the second solid-state transformer are similar to the structure of the foregoing solid-state transformer 301. Specifically, the first solid-state transformer may include: a fifth AC/DC converter, configured to convert the first alternating current into a first primary direct current; and a first high-frequency DC/DC converter, coupled to the fifth AC/DC converter, and configured to convert the first primary direct current into the first direct current; and the second solid-state transformer may include: a sixth AC/DC converter, configured to convert the second alternating current into a second primary direct current; and a second high-frequency DC/DC converter, coupled to the sixth AC/DC converter, and configured to convert the second primary direct current into the fourth direct current.

The first high-frequency DC/DC converter and the second high-frequency DC/DC converter are DC/DC converters that include power electronic components. Compared with a conventional low-frequency DC/DC converter, the high-frequency DC/DC converter has a smaller quantity of turns of coils, a smaller structural size, and lower costs. In addition, the high-frequency DC/DC converter may further be configured to implement isolation between an alternating current and a direct current, so as to avoid the alternating current from interfering with the direct current.

In addition, the first solid-state transformer further includes a first controller, configured to control parameters of the first high-frequency DC/DC converter; and the second solid-state transformer further includes a second controller, configured to control parameters of the second high-frequency DC/DC converter. Specifically, parameters of the high-frequency DC/DC converter may include a droop slope, and may further include bandwidths of a voltage loop and a current loop.

In the power supply system 400, the first power supply apparatus 401 and the second power supply apparatus 402 are connected by using the bus tie switch unit 403. The bus tie switch unit 403 may function when the first solid-state transformer and the second solid-state transformer need maintenance. In actual application, when the power supply system 400 operates normally, the first switch unit and the second switch unit are closed, and the bus tie switch unit 403 is opened; when the first solid-state transformer needs to be maintained, the bus tie switch unit 403 is closed and the first switch unit is opened; and after the maintenance of the first solid-state transformer is completed, the first switch unit is closed and the bus tie switch unit 403 is opened; and when the second solid-state transformer needs to be maintained, the bus tie switch unit 403 is closed and the second switch unit is opened; and after maintenance of the second solid-state transformer is completed, the second switch unit is closed and the bus tie switch unit 403 is opened.

It is easy to learn that, when the first solid-state transformer needs to be maintained, the first switch unit is opened, the first power supply apparatus 401 no longer operates, the bus tie switch unit 403 is closed, and the fourth direct current output by the second solid-state transformer in the second power supply apparatus 402 may be output to the second DC/DC converter by using the bus tie switch unit 403. Therefore, the second power supply apparatus 402 may replace the first power supply apparatus 401 to supply power to the first part of components in the load. In other words, when the first solid-state transformer needs to be maintained, the second power supply apparatus 402 supplies power to all components in the load. Similarly, when the second solid-state transformer needs to be maintained, the second switch unit is opened, the second power supply apparatus 402 no longer operates, the bus tie switch unit 403 is closed, and the first direct current output by the first solid-state transformer in the first power supply apparatus 401 may be output to the fourth DC/DC converter by using the bus tie switch unit 403. Therefore, the first power supply apparatus 401 may replace the second power supply apparatus 402 to supply power to the second part of components in the load. In other words, when the second solid-state transformer needs to be maintained, the first power supply apparatus 401 supplies power to all the components in the load.

In actual application, when the power supply system 400 operates normally, the first switch unit and the second switch unit are closed, and the bus tie switch unit 403 is opened. When the first solid-state transformer needs to be maintained, the bus tie switch unit 403 may be first closed, and then the first switch unit is opened. The reason is as follows: If the first switch unit is first opened, the first power supply apparatus 401 no longer operates, and cannot supply power to the first part of components in the load. In this case, the bus tie switch unit 403 is opened, and the second power supply apparatus 402 cannot supply power to the first part of components. Consequently, the first part of components is powered off, and the load cannot run normally. When maintenance of the first solid-state transformer is completed, the first switch unit may be first closed, and then the bus tie switch unit 403 may be opened. The reason is as follows: If the bus tie switch unit 403 is first opened, because the first switch unit is in an opened state in this case, neither the first power supply apparatus 401 nor the second power supply apparatus 402 can supply power to the first part of components. Consequently, the first part of components is powered off, and the load cannot run normally.

Similarly, when the second solid-state transformer needs to be maintained, the bus tie switch unit 403 may be first closed, and then the second switch unit may be opened. When the maintenance of the second solid-state transformer is completed, the second switch unit may be first closed, and then the bus tie switch unit 403 may be opened.

It should be noted that, when the first solid-state transformer (or the second solid-state transformer) is maintained, to avoid a parallel operation fault in the first solid-state transformer and the second solid-state transformer, the bus tie switch unit 403 may be closed when a voltage difference between the two terminals of the bus tie switch unit 403 is relatively small or when the bus tie switch unit 403 has power at one terminal and no power at the other terminal.

In addition, as described above, the first solid-state transformer may further include the first controller, and the second solid-state transformer may further include the second controller. Therefore, when the first solid-state transformer or the second solid-state transformer is maintained, open and close of the first switch unit may be controlled by the first controller, and open and close of the second switch unit may be controlled by the second controller. In addition, open and close of the bus tie switch unit 403 may be controlled by the first controller or the second controller. For example, the first controller may send, to the bus tie switch unit 403, an indication signal used to indicate close of the bus tie switch unit 403, and the bus tie switch unit 403 is closed after receiving the indication signal.

Certainly, the open and close of each of the first switch unit, the second switch unit, and the bus tie switch unit 403 may alternatively be controlled by another controller in the power supply system 400. This is not specifically limited in this embodiment of this application.

It can be easily learned from the foregoing analysis that, the first switch unit, the second switch unit, and the bus tie switch unit 403 are all closed in a process of maintaining the first solid-state transformer or the second solid-state transformer (for example, when the first solid-state transformer needs to be maintained, the bus tie switch unit 403 has been closed but the first switch unit has not been opened yet). When it is detected that the first switch unit, the second switch unit, and the bus tie switch unit 403 are all closed, the first controller may control a droop slope in a control algorithm of the first high-frequency DC/DC converter to increase, and the second controller may also control a droop slope in a control algorithm of the second high-frequency DC/DC converter to increase, to improve current equalization performance of the first power supply apparatus 401 and the second power supply apparatus 402, so that currents flowing through the first power supply apparatus 401 and the second power supply apparatus 402 are approximately equal.

It should be understood that, in some embodiments of this application, the first power supply apparatus 401 preferentially supplies power to the first part of components in the load, and the second power supply apparatus 402 preferentially supplies power to the second part of components in the load. When the first solid-state transformer is maintained, the second power supply apparatus 402 supplies power to all the components in the load. If the second power supply apparatus 402 is overloaded, the bus tie switch unit 403 may be opened, to ensure that the second power supply apparatus preferentially supplies power to the second part of components. Similarly, the first power supply apparatus 401 has the same protection mechanism for the first part of components, and details are not described herein.

In conclusion, according to the power supply system 400 provided in an embodiment of this application, in each power supply apparatus, the solid-state transformer may be used to convert an alternating current to obtain a direct current, so that the DC/DC converter converts the obtained direct current into a direct current that supplies power to some components in the load. This conversion process requires a relatively small quantity of power conversion components, reduces the costs and occupied space of the power supply apparatus, and reduces loss in power supply steps. In addition, during energy storage, another DC/DC converter is used to convert the direct current output by the solid-state transformer into a direct current on which the energy storage component performs energy storage. In this way, a voltage fluctuation of the energy storage component in a charging or discharging process does not affect the next-stage circuit, thereby avoiding a voltage fluctuation when power is supplied to some components in the load. By using the two power supply apparatuses in the power supply system 400, power can be supplied to all the components in the load. A relatively small quantity of power conversion components are used in each of the two power supply apparatuses. This reduces the costs and occupied space of the power supply system 400, and reduces loss in power supply steps.

It should be noted that, in the power supply system 400, internal structures and functions of the first power supply apparatus 401 and the second power supply apparatus 402 are similar to those of the foregoing power supply apparatus 300. For information about the first power supply apparatus 401 and the second power supply apparatus 402 that is not described in detail, refer to the related description about the foregoing power supply apparatus 300. Details are not described herein.

Figure 5:
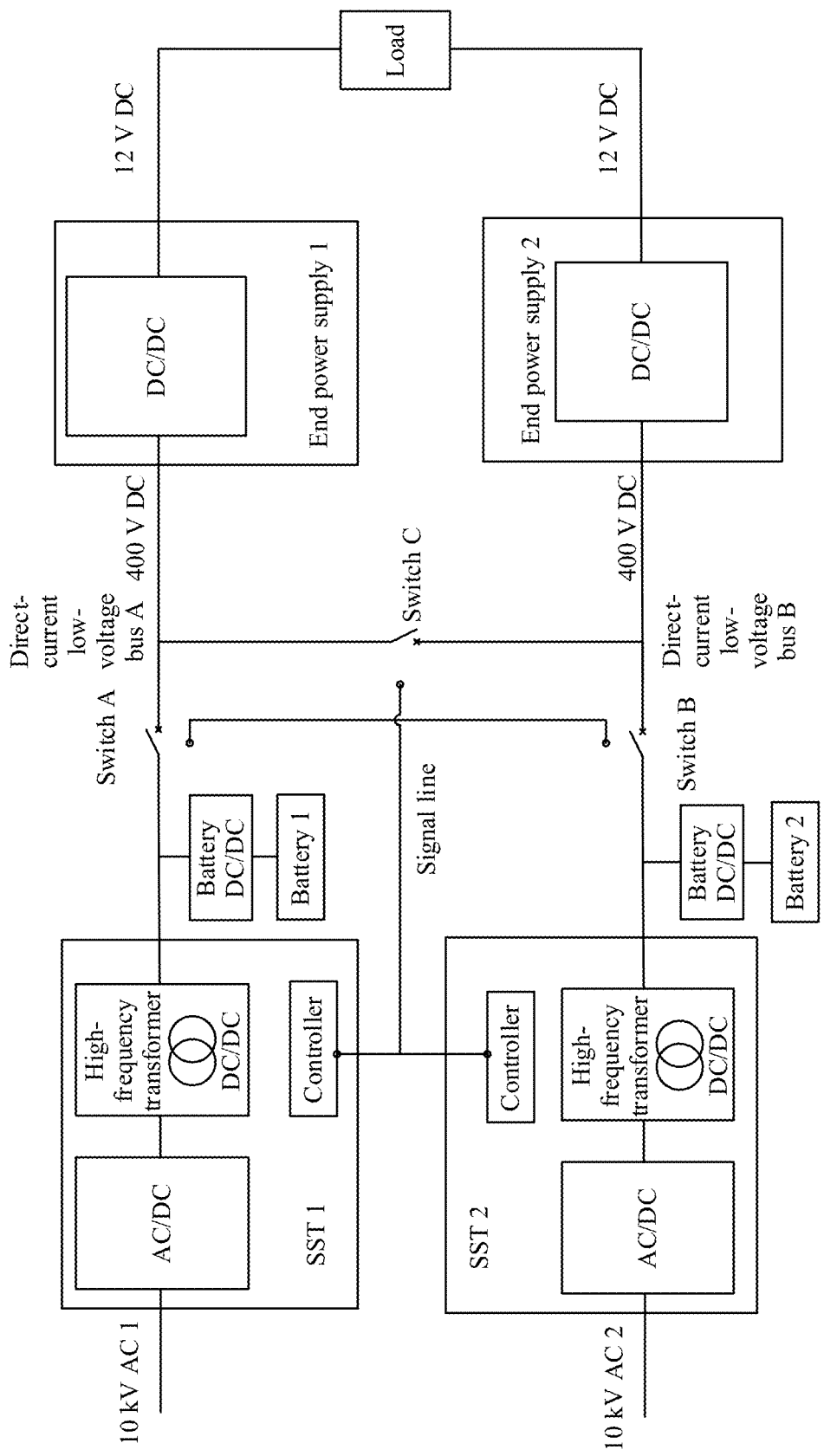
FIG. 5 is a schematic diagram of a structure of another power supply system according to an embodiment of this application.

Based on a same inventive concept, an embodiment of this application further provides a power supply system. As shown in FIG. 5, the power supply system may be considered as an example of the power supply system 400.

Specifically, the power supply system includes: SST 1 (an example of the first solid-state transformer), SST 2 (an example of the second solid-state transformer), battery 1 (an example of the first energy storage component) and battery DC/DC converter (an example of the first DC/DC converter), battery 2 (an example of the second energy storage component) and battery DC/DC (an example of the third DC/DC converter), switch A (an example of the first switch unit), switch B (an example of the second switch unit), switch C (an example of the bus tie switch unit 403), end power supply 1 (an example of the second DC/DC converter), end power supply 2 (an example of the fourth DC/DC converter), and a load.

A medium voltage (10 kV) in an alternating current power grid enters SST 1, and is converted into a stable low voltage (400 V or another voltage) direct current after passing through SST 1. There are two converters in SST 1: AC/DC and DC/DC. The DC/DC converter can implement isolation between the medium-voltage alternating current and the low-voltage direct current. Battery 1 is coupled to low-voltage (400 V or another voltage) direct-current bus A by using the battery DC/DC. The low-voltage direct current is supplied to end power supply 1 after passing through switch A. End power supply 1 includes one DC/DC converter that converts the 400 V direct current into a lower-voltage direct current (12 V direct current).

There is another power supply loop in the power supply system: A 10 kV alternating current reaches end power supply 2 after passing through SST 2 and then an energy storage system that includes battery 2 and battery DC/DC. The power supply loop corresponding to SST 2 is similar to the power supply loop corresponding to SST 1. Details are not described herein again.

In the power supply system shown in FIG. 5, bus tie switch unit C is disposed between switch A and switch B. SST 1 and SST 2 can detect states of switch A, switch B, and switch C by using a signal line.

During normal operation, switches A and B are closed, and switch C is opened. In addition to supplying power to the end power supply, the SST charges the battery through the battery DC/DC. When the 10 kV power grid at the input terminal of the SST encounters a power failure, the battery supplies power to the end power supply through the battery DC/DC. During charging or discharging of the battery, a battery voltage is changing. However, because the battery DC/DC exists between the battery and the direct-current low-voltage bus, the direct-current low-voltage bus transmits a stable 400 V direct current. Because the input to the end power supply is a stable 400 V direct current, the end power supply can convert the 400 V direct current into a stable 12 V direct current by using one DC/DC converter, so as to supply power to the load.

When SST 1(2) needs to be maintained, switch C is first closed, and then switch A(B) is opened. When maintenance of SST 1(2) is completed and SST 1(2) needs to be connected, switch A(B) is first closed and then switch C is opened. The foregoing process can ensure that power supply to the two end loads is not interrupted during the maintenance of SST 1(2).

In addition, when switch A, switch B, and switch C are all closed, and SST 1 and SST 2 operate normally, a controller in each of SST 1 and SST 2 may separately control a droop slope in a DC/DC control algorithm to increase, so as to improve current equalization performance in parallel operation of SST 1 and SST 2. When SST 1 operates normally, SST 2 does not operate, switch A and switch C are closed, and switch B is opened, if SST 1 is overloaded, switch C is opened to preferentially ensure power supply to the end load corresponding to SST 1. Similarly, SST 2 also has the same protection logic, and details are not described herein.

Figure 6:
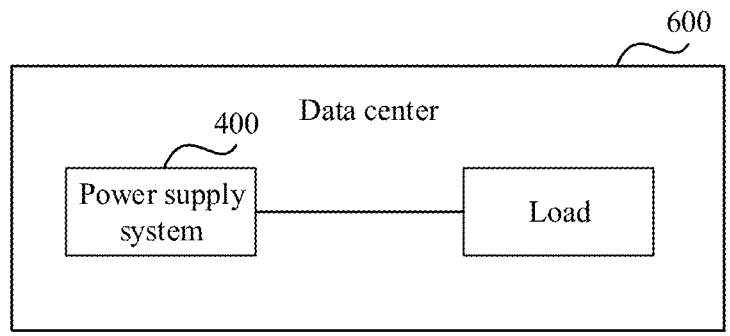
FIG. 6 is a schematic diagram of a structure of a second data center according to an embodiment of this application.

Based on the same inventive concept, an embodiment of this application further provides a data center. As shown in FIG. 6, the data center 600 includes a load and the foregoing power supply system 400, where the power supply system 400 is configured to supply power to the load.

For an embodiment of the structure and function of the power supply system 400, refer to the foregoing description. Details are not described herein again.

In addition, as described above, the data center may include a plurality of power supply apparatuses/power supply systems and a plurality of loads, and there may be a plurality of types of architectures for the power supply apparatuses/power supply systems and the loads. The following describes two data center architectures formed by the power supply apparatus 300.

Figure 7:
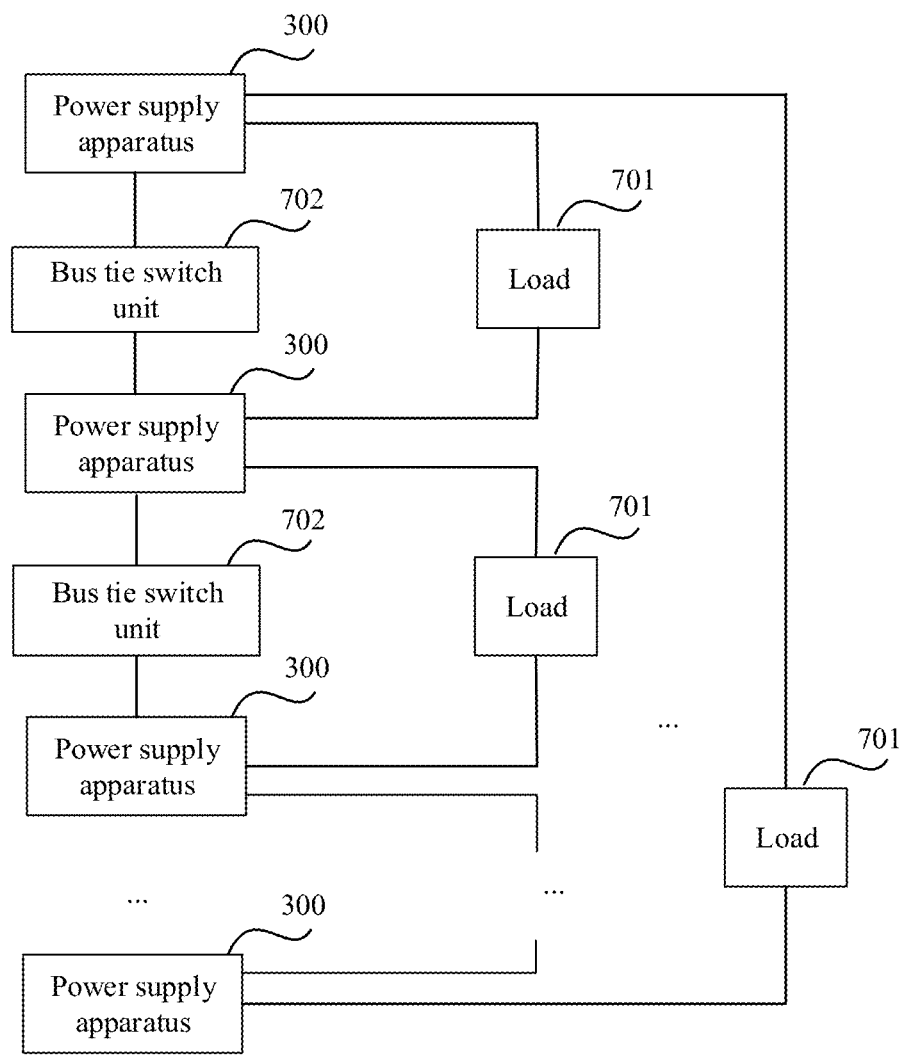
FIG. 7 is a schematic diagram of a structure of a third data center according to an embodiment of this application.

First Architecture:

As shown in FIG. 7, the data center includes N loads 701, at least one bus tie switch unit 702, and N power supply apparatuses 300, where $N \geq 2$. In the N power supply apparatuses 300, an $n^{th}$ power supply apparatus 300 is coupled to an (n+1)th power supply apparatus 300 by using one bus tie switch unit 702, and the N power supply apparatuses 300 are configured to supply power to the N loads 701, where $1 \leq n \leq N-1$.

The data center may be considered as a DR data center. In the data center, the quantity of the power supply apparatuses 300 is the same as that of the loads 701, and the N power supply apparatuses are configured to supply power to the N loads. Specifically, in the N power supply apparatuses, a first power supply apparatus and a second power supply apparatus are configured to supply power to one load, the second power supply apparatus and a third power supply apparatus are configured to supply power to one load, . . . , an $(N-1)^{th}$ power supply apparatus and an $N^{th}$ power supply apparatus are configured to supply power to one load, and the first power supply apparatus and the $N^{th}$ power supply apparatus are configured to supply power to one load.

It should be noted that, for an embodiment of the structure of the power supply apparatus 300, refer to the foregoing description. Details are not described herein again.

Figure 8:
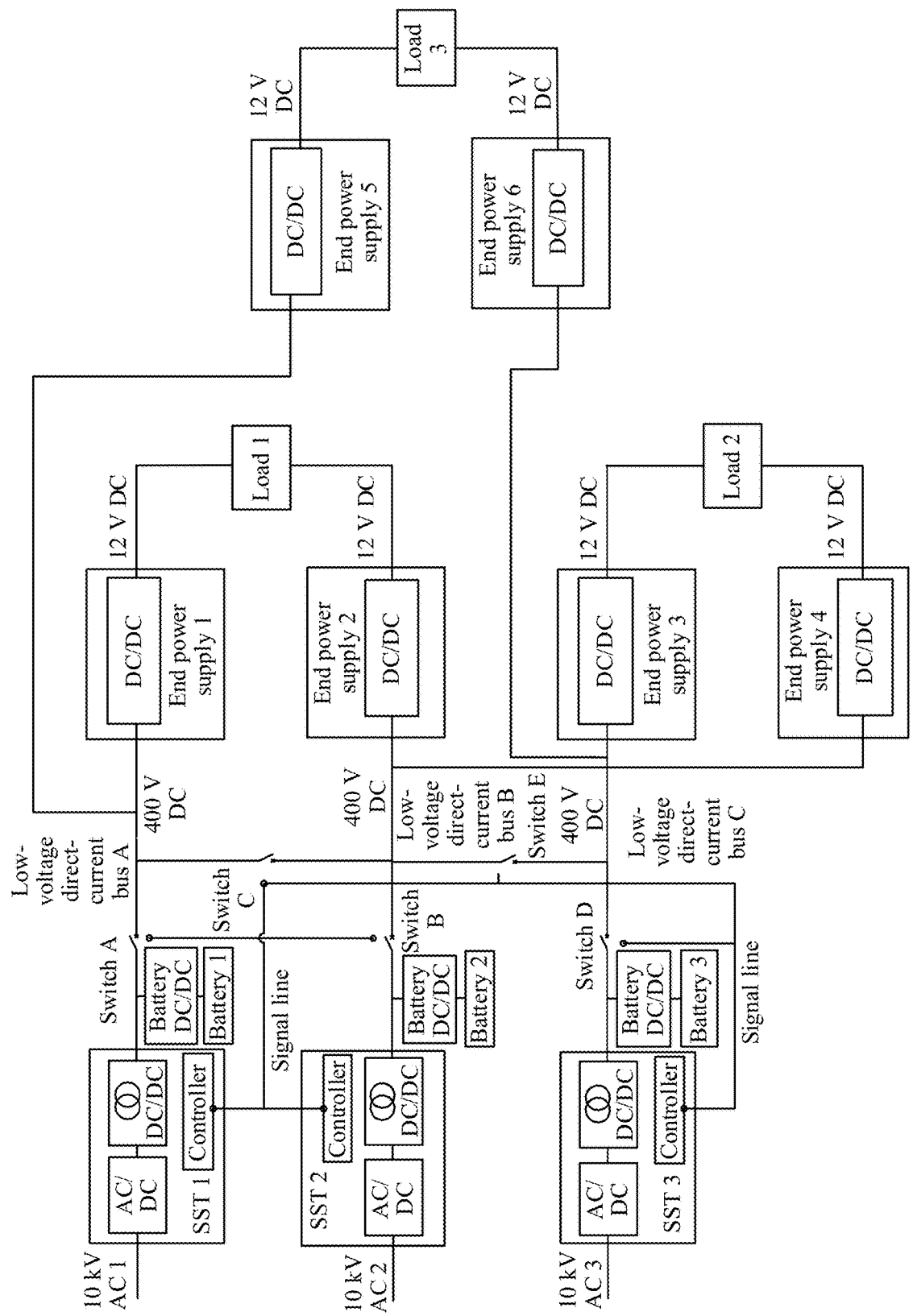
FIG. 8 is a schematic diagram of a structure of a fourth data center according to an embodiment of this application.

For example, FIG. 8 shows an example of the data center shown in FIG. 7. In the example in FIG. 8, the data center includes three loads (load 1, load 2, and load 3), three power supply apparatuses, and two bus tie switch units (switch C and switch E). The three power supply apparatuses from top to bottom are respectively referred to as a first power supply apparatus, a second power supply apparatus, and a third power supply apparatus. The first power supply apparatus and the second power supply apparatus are configured to supply power to load 1, the second power supply apparatus and the third power supply apparatus are configured to supply power to load 2, and the first power supply apparatus and the third power supply apparatus are configured to supply power to load 3.

For an embodiment of the structure of each power supply apparatus in the power supply system shown in FIG. 8, refer to the related description in FIG. 5. Details are not described herein again. It should be noted that, each power supply apparatus needs to supply power to two loads. Therefore, each power supply apparatus includes two end power supplies, and each end power supply is configured to provide a direct current to one load. For example, the first power supply apparatus includes end power supply 1 and end power supply 5, which are respectively configured to provide direct currents to load 1 and load 3.

Figure 9:
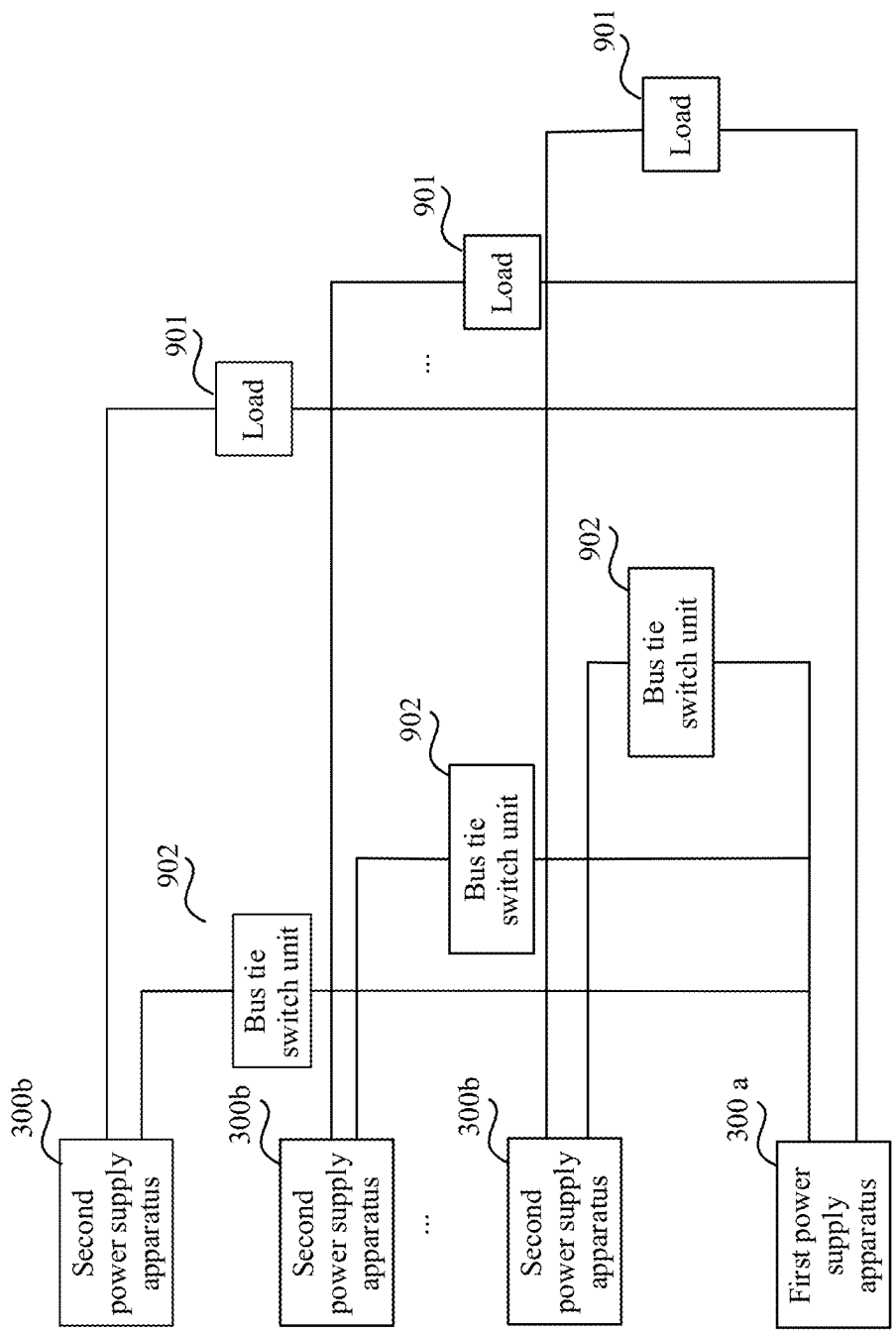
FIG. 9 is a schematic diagram of a structure of a fifth data center according to an embodiment of this application.

Second Architecture:

As shown in FIG. 9, the data center includes at least one load 901, at least one bus tie switch unit 902, and a plurality of power supply apparatuses 300. The plurality of power supply apparatuses 300 include a first power supply apparatus 300a and at least one second power supply apparatus 300b. Any one of the at least one second power supply apparatus 300b and the first power supply apparatus 300a are configured to supply power to one load 901 in the data center. Each of the at least one second power supply apparatus 300b is coupled to the first power supply apparatus 300a by using one bus tie switch unit 902.

The data center may be considered as an N+R data center. In the data center, the first power supply apparatus 300a and the second power supply apparatus 300b supply power to one load 901, the first power supply apparatus 300a serves as a backup of the second power supply apparatus 300b, and the first power supply apparatus 300a and the second power supply apparatus 300b do not operate at the same time. In other words, for the first power supply apparatus 300a and the second power supply apparatus 300b that supply power to a same load, when the second power supply apparatus 300b operates normally, the first power supply apparatus 300a does not supply power to the load, and the second power supply apparatus 300b supplies power to all components in the load. Only when the second power supply apparatus 300b does not operate (for example, upon a power failure or maintenance), the first power supply apparatus 300a serves as a backup of the second power supply apparatus 300b, and supplies power to all the components in the load.

It should be noted that, for embodiments of the structures of the first power supply apparatus 300a and the second power supply apparatus 300b, refer to the foregoing description about the power supply apparatus 300. Details are not described herein again.

Figure 10:
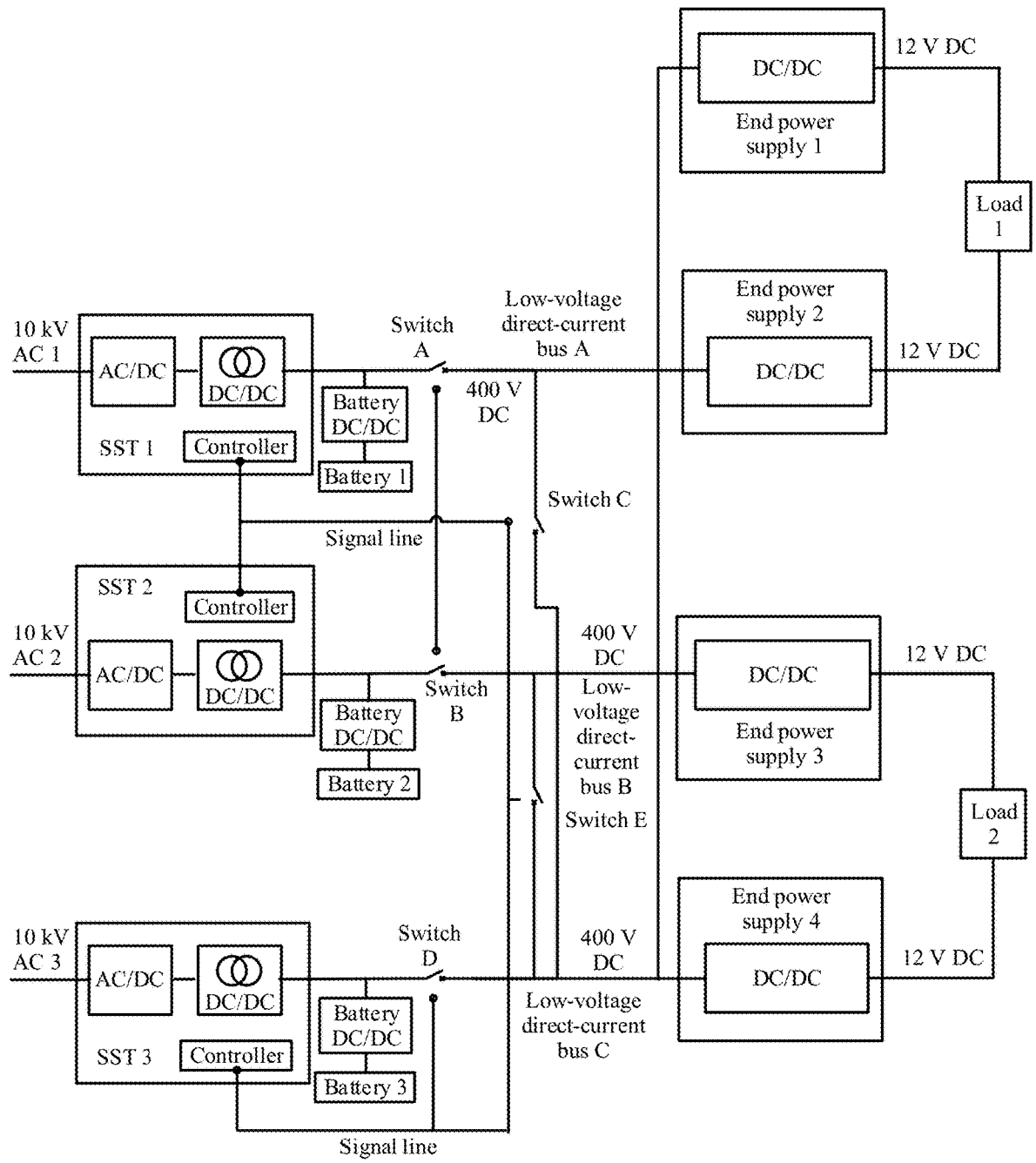
FIG. 10 is a schematic diagram of a structure of a sixth data center according to an embodiment of this application.

For example, FIG. 10 shows an example of the data center shown in FIG. 9. In the example in FIG. 10, the data center includes two loads (load 1 and load 2), three power supply apparatuses, and two bus tie switch units (switch C and switch E). The three power supply apparatuses from top to bottom are respectively referred to as a first power supply apparatus, a second power supply apparatus, and a third power supply apparatus. The first power supply apparatus and the second power supply apparatus may be considered as the second power supply apparatuses 300b, and the third power supply apparatus may be considered as the first power supply apparatus 300a. The first power supply apparatus and the second power supply apparatus are configured to supply power to load 1, and the second power supply apparatus and the third power supply apparatus are configured to supply power to load 2.

For an embodiment of the structure of each power supply apparatus in the power supply system shown in FIG. 10, refer to the related description in FIG. 5. Details are not described herein again. It should be noted that, the third power supply apparatus needs to separately supply power to the two loads. Therefore, the third power supply apparatus includes two end power supplies: end power supply 1 and end power supply 4, which are respectively configured to provide direct currents to load 1 and load 2.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A power supply system, comprising a first power supply apparatus, a second power supply apparatus, and a bus tie switch unit, wherein
    the first power supply apparatus comprises:
    a first solid-state transformer, configured to convert a first alternating current into a first direct current;
    a first direct current/direct current converter, coupled to the first solid-state transformer, and configured to convert the first direct current into a second direct current;
    a first energy storage component, coupled to the first direct current/direct current converter, and configured to perform energy storage on the second direct current;
    a first switch unit, coupled to the first direct current/direct current converter and a second direct current/direct current converter; and
    the second direct current/direct current converter configured to convert the second direct current into a third direct current, wherein the third direct current supplies power to a load; and
    the second power supply apparatus comprises:
    a second solid-state transformer, configured to convert a second alternating current into a fourth direct current;
    a third direct current/direct current converter, coupled to the second solid-state transformer, and configured to convert the fourth direct current into a fifth direct current;
    a second energy storage component, coupled to the third direct current/direct current converter, and configured to perform energy storage on the fifth direct current;
    a second switch unit, coupled to the third direct current/direct current converter and a fourth direct current/direct current converter; and
    the fourth direct current/direct current converter configured to convert the fifth direct current into a sixth direct current, wherein the sixth direct current supplies power to the load; wherein
    two terminals of the bus tie switch unit are respectively coupled to the first switch unit and the second switch unit.

2. The power supply system according to claim 1, wherein the first solid-state transformer comprises:
    a fifth alternating current/direct current converter, configured to convert the first alternating current into a first primary direct current, and
    a first high-frequency direct current/direct current converter, coupled to the fifth alternating current/direct current converter, and configured to convert the first primary direct current into the first direct current; and
    the second solid-state transformer comprises:
    a sixth alternating current/direct current converter, configured to convert the second alternating current into a second primary direct current, and
    a second high-frequency direct current/direct current converter, coupled to the sixth alternating current/direct current converter, and configured to convert the second primary direct current into the fourth direct current.

3. The power supply system according to claim 1, wherein the first solid-state transformer further comprises:
    a first controller, configured to control a parameter of a first high-frequency direct current/direct current converter; and
    the second solid-state transformer further comprises:
    a second controller, configured to control a parameter of a second high-frequency direct current/direct current converter.

4. The power supply system according to claim 2, wherein the first solid-state transformer further comprises:
    a first controller, configured to control a parameter of the first high-frequency direct current/direct current converter; and
    the second solid-state transformer further comprises:
    a second controller, configured to control a parameter of the second high-frequency direct current/direct current converter.

5. The power supply system according to claim 1, wherein when the power supply system operates normally, the first switch unit and the second switch unit are closed, and the bus tie switch unit is opened.

6. The power supply system according to claim 1, wherein when the first solid-state transformer needs maintenance, the bus tie switch unit is closed and the first switch unit is opened; and after maintenance of the first solid-state transformer is completed, the first switch unit is closed and the bus tie switch unit is opened.

7. The power supply system according to claim 1, wherein when the second solid-state transformer needs maintenance, the bus tie switch unit is closed and the second switch unit is opened; and after maintenance of the second solid-state transformer is completed, the second switch unit is closed and the bus tie switch unit is opened.

8. The power supply system according to claim 1, wherein the load is a server in a data center, the first energy storage component and the second energy storage component are batteries, the third direct current supplies power to one or more components in the server, and the sixth direct current supplies power to other components in the server.

9. A data center, comprising N loads, at least one bus tie switch unit, and N power supply apparatuses, wherein N≥2; and
    an $n^{th}$ power supply apparatus in the N power supply apparatuses is coupled to an $(n+1)^{th}$ power supply apparatus by using one bus tie switch unit, the N power supply apparatuses are configured to supply power to the N loads, and 1≤n≤N−1;

wherein at least one power supply apparatus in the N power supply apparatuses, comprises:

a solid-state transformer, configured to convert an alternating current into a first direct current;

a first direct current/direct current converter, coupled to the solid-state transformer, and configured to convert the first direct current into a second direct current;

an energy storage component, coupled to the first direct current/direct current converter, and configured to perform energy storage on the second direct current; and a second direct current/direct current converter, coupled to the first direct current/direct current converter, and configured to convert the second direct current into a third direct current, wherein the third direct current supplies power to a load.

10. The data center according to claim 9, wherein the solid-state transformer comprises:

a first alternating current/direct current converter, configured to convert the alternating current into a primary direct current; and a high-frequency direct current/direct current converter, coupled to the first alternating current/direct current converter, and configured to convert the primary direct current into the first direct current.

11. The data center according to claim 9, wherein the solid-state transformer further comprises:

a controller, configured to control a parameter of a high-frequency direct current/direct current converter.

12. The data center according to claim 9, further comprising:

a switch unit, wherein a first terminal of the switch unit is coupled to the first direct current/direct current converter, and a second terminal of the switch unit is coupled to the second direct current/direct current converter.

13. The data center according to claim 9, wherein each of the N loads is a server in the data center, and the energy storage component is a battery.

14. The data center according to claim 10, wherein the solid-state transformer further comprises:

a controller, configured to control a parameter of the high-frequency direct current/direct current converter.

* * * * *